United States Patent
Chang et al.

(10) Patent No.: US 9,367,103 B2
(45) Date of Patent: Jun. 14, 2016

(54) HEAT DISSIPATION DEVICE

(71) Applicant: ASIA VITAL COMPONENTS CO., LTD., New Taipei (TW)

(72) Inventors: Bor-Haw Chang, New Taipei (TW); Chung-Shu Wang, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 209 days.

(21) Appl. No.: 13/974,017

(22) Filed: Aug. 22, 2013

(65) Prior Publication Data
US 2015/0055295 A1 Feb. 26, 2015

(51) Int. Cl.
*G06F 1/20* (2006.01)

(52) U.S. Cl.
CPC ........................................ *G06F 1/203* (2013.01)

(58) Field of Classification Search
CPC .................. H05K 7/20136; H05K 7/20181
USPC .................. 361/679.46–679.54, 688–723
See application file for complete search history.

(56) References Cited

U.S. PATENT DOCUMENTS

| | | | |
|---|---|---|---|
| 4,780,062 A * | 10/1988 | Yamada et al. ............. | 417/410.2 |
| 4,923,000 A * | 5/1990 | Nelson ..................... | 165/122 |
| 5,008,582 A * | 4/1991 | Tanuma et al. .............. | 310/332 |
| 6,588,497 B1 * | 7/2003 | Glezer et al. .................. | 165/84 |
| 7,031,155 B2 * | 4/2006 | Sauciuc et al. ............... | 361/695 |
| 7,061,161 B2 * | 6/2006 | Scher et al. ................... | 310/328 |
| 2004/0207292 A1 * | 10/2004 | Scher et al. ................... | 310/328 |
| 2007/0001550 A1 * | 1/2007 | Palanduz et al. ............. | 310/328 |
| 2007/0037506 A1 * | 2/2007 | Lee et al. ....................... | 454/184 |
| 2008/0218972 A1 * | 9/2008 | Sauciuc et al. ............... | 361/704 |
| 2011/0005733 A1 | 1/2011 | Wada et al. | |
| 2011/0064594 A1 * | 3/2011 | Wada et al. ................ | 417/410.2 |
| 2011/0070109 A1 | 3/2011 | Kanai et al. | |
| 2013/0301218 A1 * | 11/2013 | Li et al. ......................... | 361/695 |
| 2014/0029194 A1 * | 1/2014 | Hayashi ..................... | 361/679.48 |
| 2015/0062813 A1 * | 3/2015 | Honsberg-Riedl et al. ... | 361/694 |

* cited by examiner

*Primary Examiner* — David M Sinclair
*Assistant Examiner* — Robert Brown
(74) *Attorney, Agent, or Firm* — C. G. Mersereau; Nikolai & Mersereau, P.A.

(57) ABSTRACT

A heat dissipation device is arranged in an outer case of an electronic device, and includes an oscillation assembly, an air disturbing member and at least one fixing seat. The oscillation assembly includes a base and an oscillating member provided on the base; and the air disturbing member is connected at a first end to the oscillating member and at an opposite second end to the fixing seat. When an electric power is supplied to the oscillation assembly, the oscillating member is oscillated to thereby vibrate the first end of the air disturbing member, producing a continuous wave of the air disturbing member. The waving air disturbing member in turn disturbs air in the outer case, forcing the air toward a heat source and causing air convection in the outer case to enable largely upgraded heat dissipation efficiency of the electronic device.

7 Claims, 16 Drawing Sheets

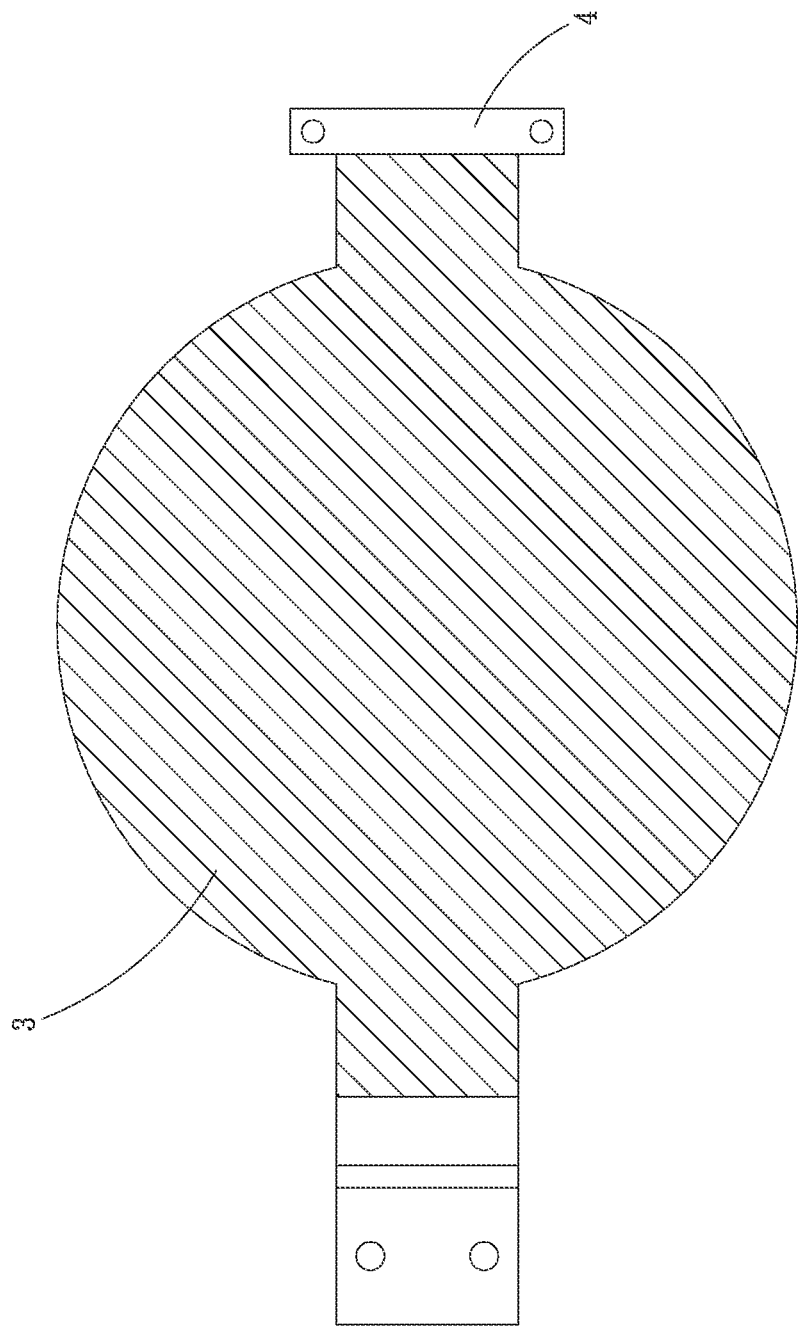

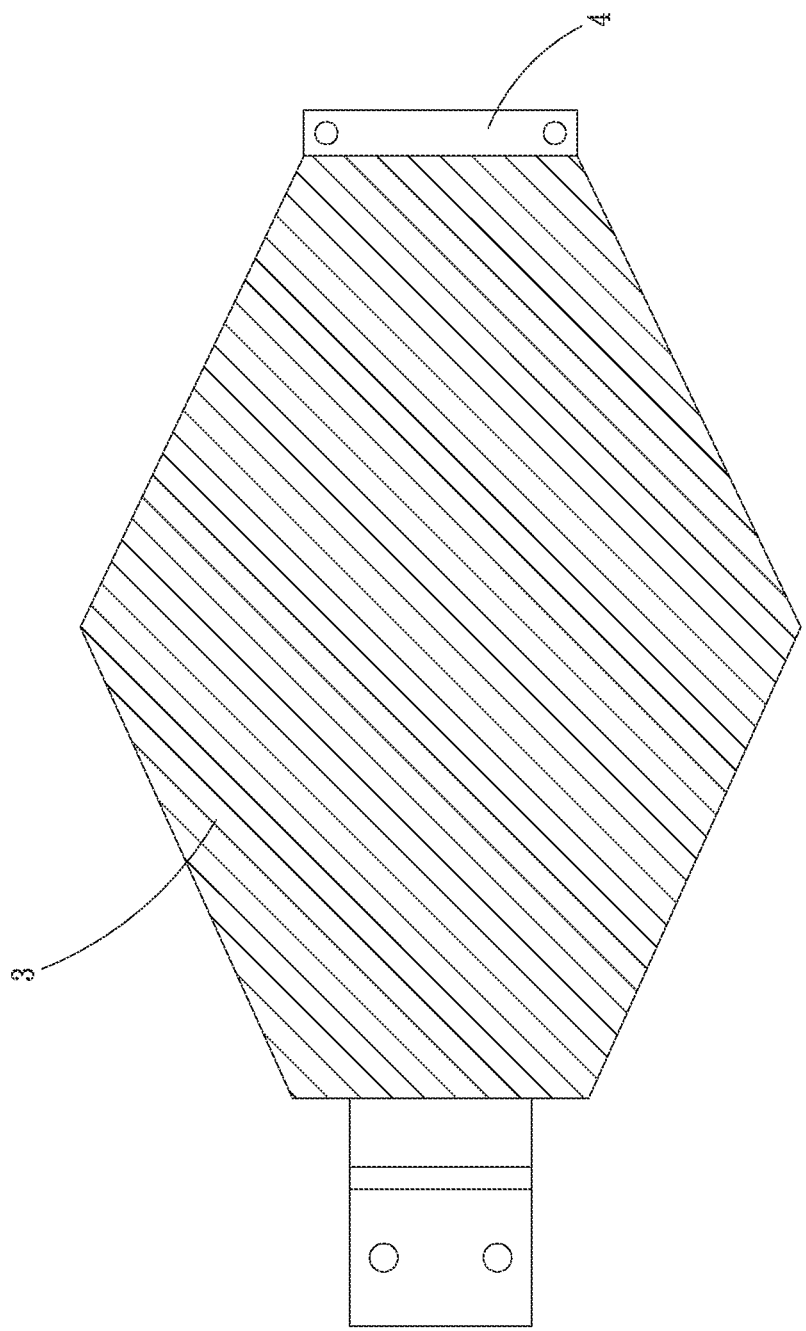

HEAT DISSIPATION DEVICE

FIELD OF THE INVENTION

The present invention relates to a heat dissipation device, and more particularly to a heat dissipation device that oscillates to produce a continuous wave of a member thereof for disturbing air and forming a relatively high static pressure of air, so as to force air toward a heat source for dissipating heat and enable largely upgraded heat dissipation efficiency.

BACKGROUND OF THE INVENTION

Following the rapid development in the electronic industrial fields in recent years, various electronic elements have largely upgraded performance to provide higher and higher operating and data processing speed. With the constantly increased operating speed of the chipset and the constantly increased number of chips inside the electronic elements, more heat is produced by the chips or the chipset during the operating thereof. The heat must be timely dissipated from the electronic elements to avoid largely lowered performance and reduced operating/data processing speed of the electronic elements. Heat undesirably accumulated in the electronic elements would even cause burnout of the electronic elements. Therefore, heat dissipation has already become one of the most important issues for electronic elements. Presently, cooling fans are the most common means for heat dissipation.

Further, miniaturization has become a main stream in the development of various electronic devices, such as notebook computers, tablet computers and mobile phones. As a result, the currently available electronic devices all have a largely reduced internal space in their outer case. Since the limited internal space of the electronic devices is almost fully occupied by the necessary circuit board and various electronic elements, there is no longer sufficient space for mounting a cooling fan. In addition, due to the largely reduced overall thickness of the current electronic devices, it is also impossible to mount the cooling fan, which includes blades and bearing having a required height, in the low-profile electronic devices. Without a cooling fan mounted therein, the electronic devices and the electronic elements thereof are subject to the risk of abnormal operation due to internally accumulated heat and require increased repair and maintenance cost.

To overcome the above-mentioned problems, compact piezoelectric chips having a very small volume have been developed for using in the limited internal space of the miniaturized electronic devices to dissipate the heat produced by the operating electronic elements in the electronic devices. However, since the piezoelectric chips fail to form a static pressure of air high enough to effectively transfer air stream to a distant location, no air convection will occur in the electronic devices to achieve the purpose of cooling the heat sources. That is, the use of the piezoelectric chips does not provide good heat dissipation effect. Under this condition, the electronic devices are easily affected by the heat produced by the heat-producing electronic elements therein and fail to operate normally, which in turn causes increased repair and maintenance cost.

SUMMARY OF THE INVENTION

A primary object of the present invention is to provide a heat dissipation device that oscillates to produce a continuous wave of a member thereof for disturbing air and forming a relatively high static pressure of air, so as to force air toward a heat source for dissipating heat and enable largely upgraded heat dissipation efficiency.

Another object of the present invention is to provide a heat dissipation device that is arranged in a limited internal space of an electronic device to effectively upgrade the heat dissipation efficiency thereof.

To achieve the above and other objects, the heat dissipation device according to the present invention is arranged in an outer case of an electronic device and includes an oscillation assembly, an air disturbing member and at least one fixing seat. The oscillation assembly includes a base and an oscillating member provided on the base; and the air disturbing member is connected at a first end to the oscillating member and at an opposite second end to the fixing seat. When an electric power is supplied to the oscillation assembly, the oscillating member is oscillated to upwardly and downwardly vibrate the first end of the air disturbing member, producing a continuous wave of the air disturbing member. The waving air disturbing member in turn disturbs air in the outer case, forcing the air toward a heat source and causing air convection in the outer case to enable largely upgraded heat dissipation efficiency of the electronic device.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 9E is a top view of a heat dissipation device according to a ninth preferred embodiment of the present invention;

FIG. 9F is a top view of a heat dissipation device according to a tenth preferred embodiment of the present invention.

DETAILED DESCRIPTION OF THE PREFERRED EMBODIMENTS

Figure 1:
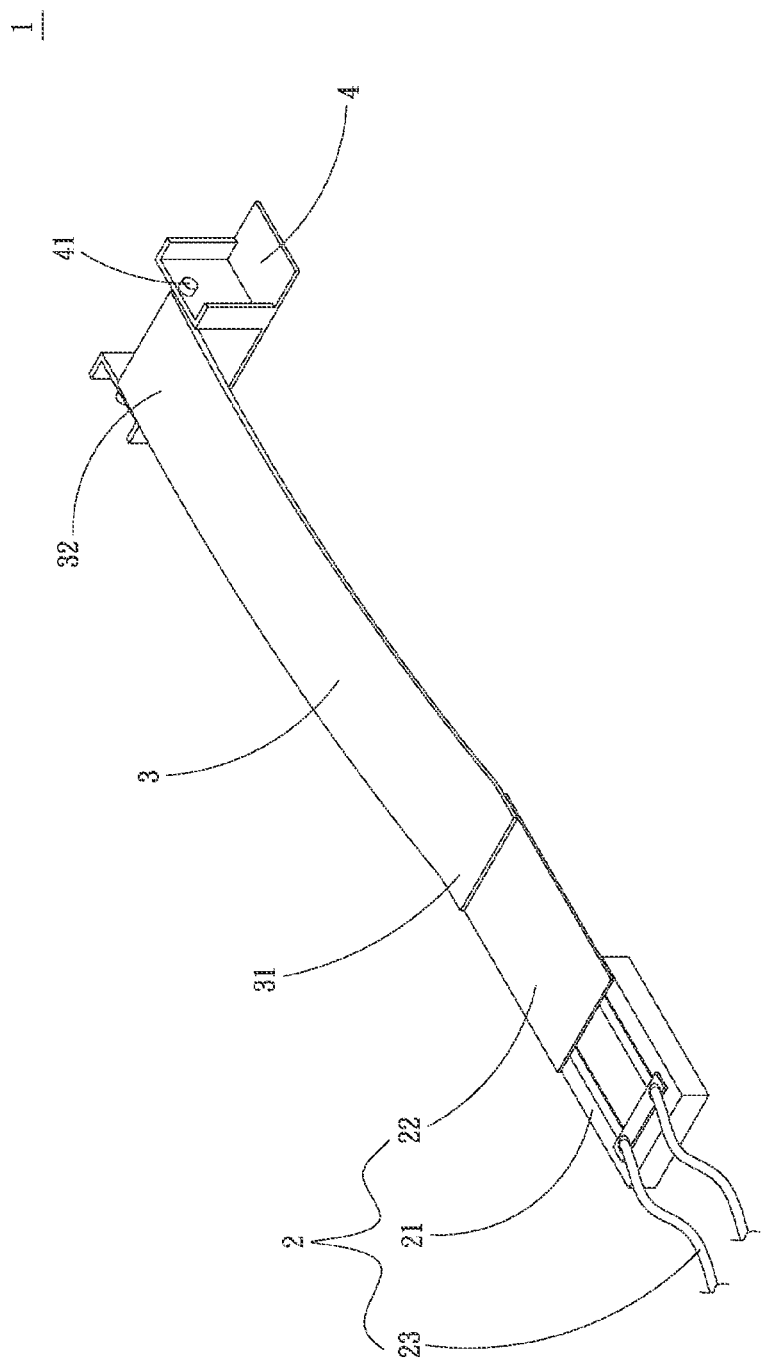
FIG. 1 is an assembled perspective view of a heat dissipation device according to a first preferred embodiment of the present invention.

The present invention will now be described with some preferred embodiments thereof and with reference to the accompanying drawings. For the purpose of easy to understand, elements that are the same in the preferred embodiments are denoted by the same reference numerals.

Figure 2:
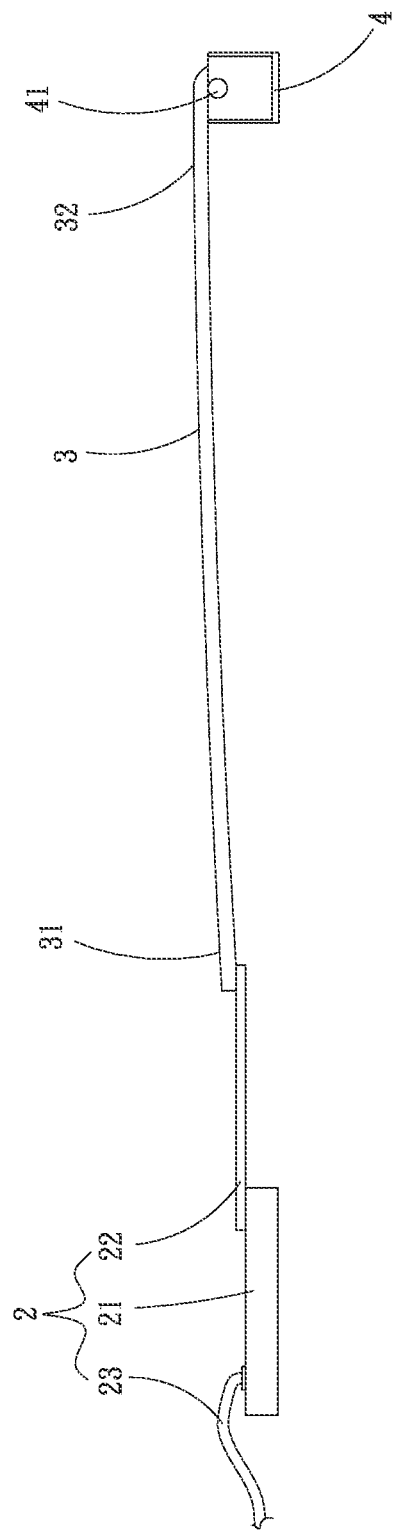
FIG. 2 is a side view of FIG. 1.

Please refer to FIGS. 1 and 2 that are assembled perspective and side views, respectively, of a heat dissipation device 1 according to a first preferred embodiment of the present invention. As shown, the heat dissipation device 1 in the first preferred embodiment includes an oscillation assembly 2, an air disturbing member 3, and at least one fixing seat 4.

The oscillation assembly 2 includes a base 21 and an oscillating member 22 provided on the base 21. The oscillation assembly 2 is adapted to generate a fixed-frequency oscillation. In the illustrated first preferred embodiment, the oscillation assembly 2 is a piezoelectric type oscillation assembly with the oscillating member 22 being a piezoelectric chip and the base 21 an electrically conducting base for supporting the piezoelectric chip thereon. The oscillation assembly 2 further includes a conductor wire 23, via which electric power is supplied to the electrically conducting base 21 for driving the piezoelectric chip 22 thereon to oscillate upward and downward.

The air disturbing member 3 has a first end 31 connected to the oscillating member 22 and an opposite second end 32 facing away from the oscillating member 22 and connected to the fixing seat 4. On the fixing seat 4, there is a joint connection portion 41 configured for connecting to the second end 32 of the air disturbing member 3 by different means, such as adhesive bonding, screw fastening, or hot-melt bonding.

Figure 3:
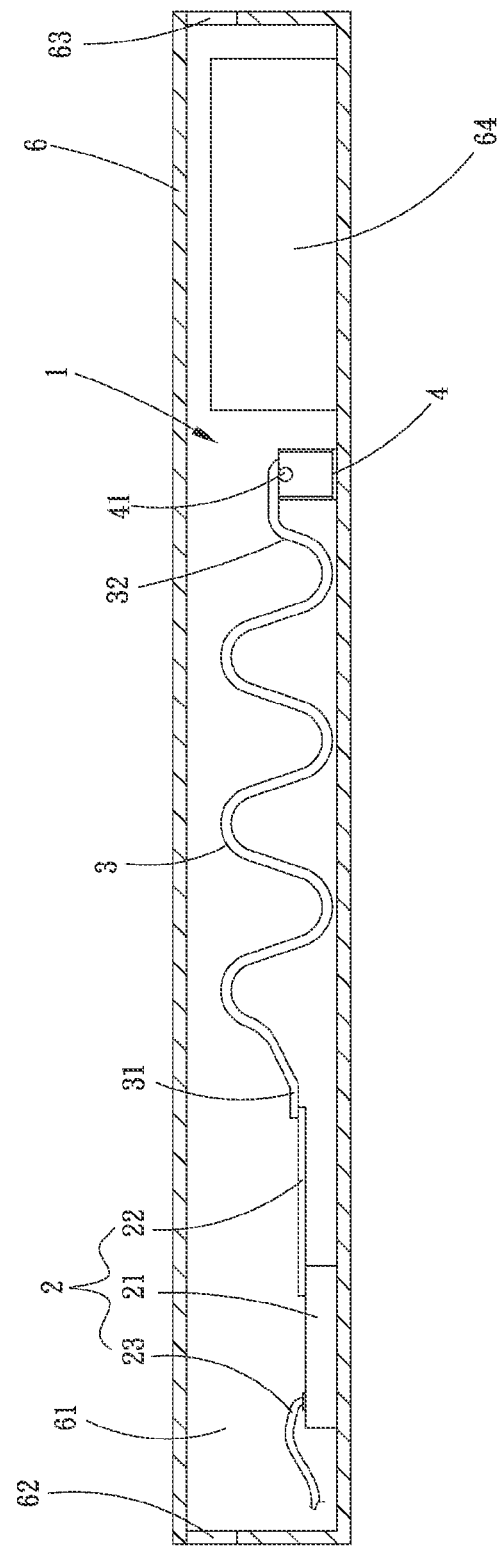
FIG. 3 is an assembled sectional side view showing the heat dissipation device of FIG. 1 in use.

FIG. 3 is a sectional side view showing the heat dissipation device 1 of FIG. 1 in use. As shown, the heat dissipation device 1 is arranged in a receiving space 61 defined in an outer case 6 of an electronic device. The outer case 6 is provided with at least one first opening 62 and at least one second opening 63. And, in the outer case 6, there is at least one heat source 64. The oscillation assembly 2 of the heat dissipation device 1 is located near the first opening 62 of the outer case 6. When an electric power is supplied via the conductor wire 23 to the base 21, a resonant frequency is produced to thereby oscillate the oscillating member 22 upward and downward. The upward and downward oscillated oscillating member 22 in turn brings the air disturbing member 3 to vibrate. The air disturbing member 3 can be made of an elastic material or a flexible material. In the illustrated first preferred embodiment, while the air disturbing member 3 is shown as a piece of elastic fiber fabric, it is only illustrative and not intended to limit the present invention thereto. When the oscillating member 22 is oscillated upward and downward, it brings the first end 31 of the air disturbing member 3 to vibrate upward and downward at a fixed frequency. The vibration propagates through every section of the air disturbing member 3 and accordingly, produces a continuous wave of the air disturbing member 3 to disturb air in the receiving space 61 and form a relatively high static pressure of air in the outer case 6, forcing the air toward the fixing seat 4 and the heat source 64 and finally out of the outer case 6 via the second opening 63. At the same time, air outside the outer case 6 is induced into the receiving space 61 via the first opening 62. In this manner, convection of air inside and outside the outer case 6 occurs to achieve the effect of dissipating the heat produced by the heat source 64 into the environment outside the electronic device. With the heat dissipation device 1 of the present invention, it is able to effectively enhance the air convection in the very limited space of the outer case 6 of the electronic device and enable largely upgraded heat dissipation efficiency.

Figure 4:
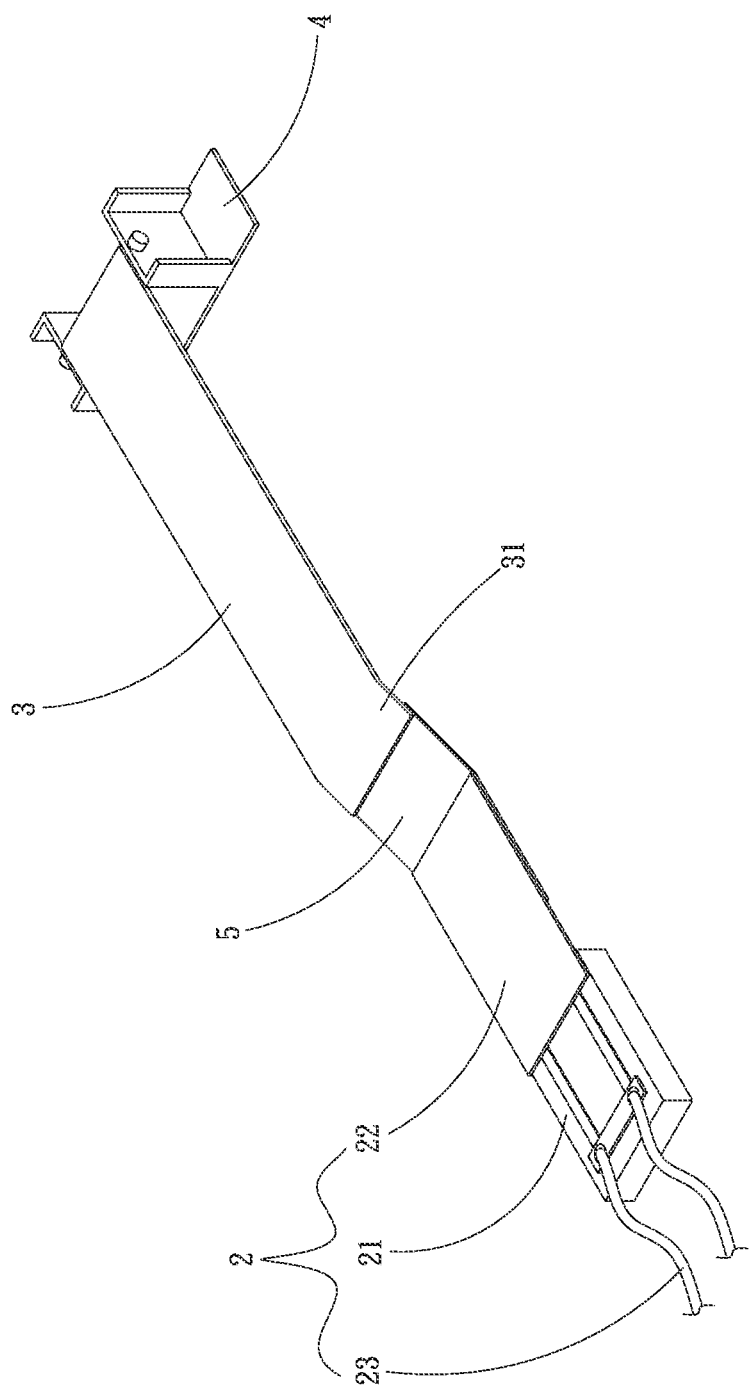
FIG. 4 is an assembled perspective view of a heat dissipation device according to a second preferred embodiment of the present invention.
Figure 5:
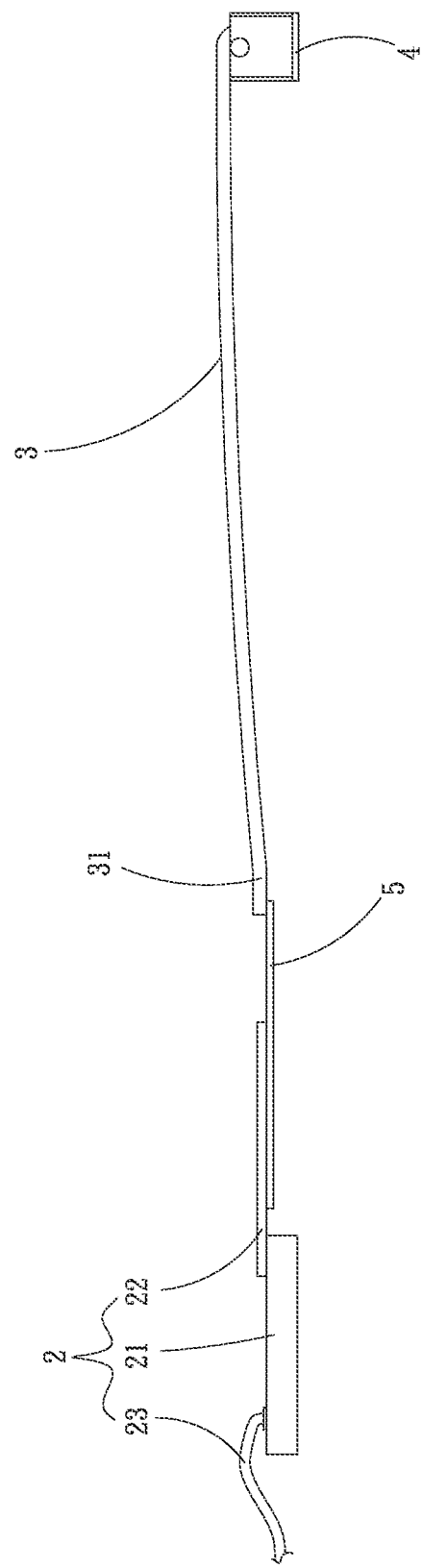
FIG. 5 is a side view of FIG. 4.
Figure 6:
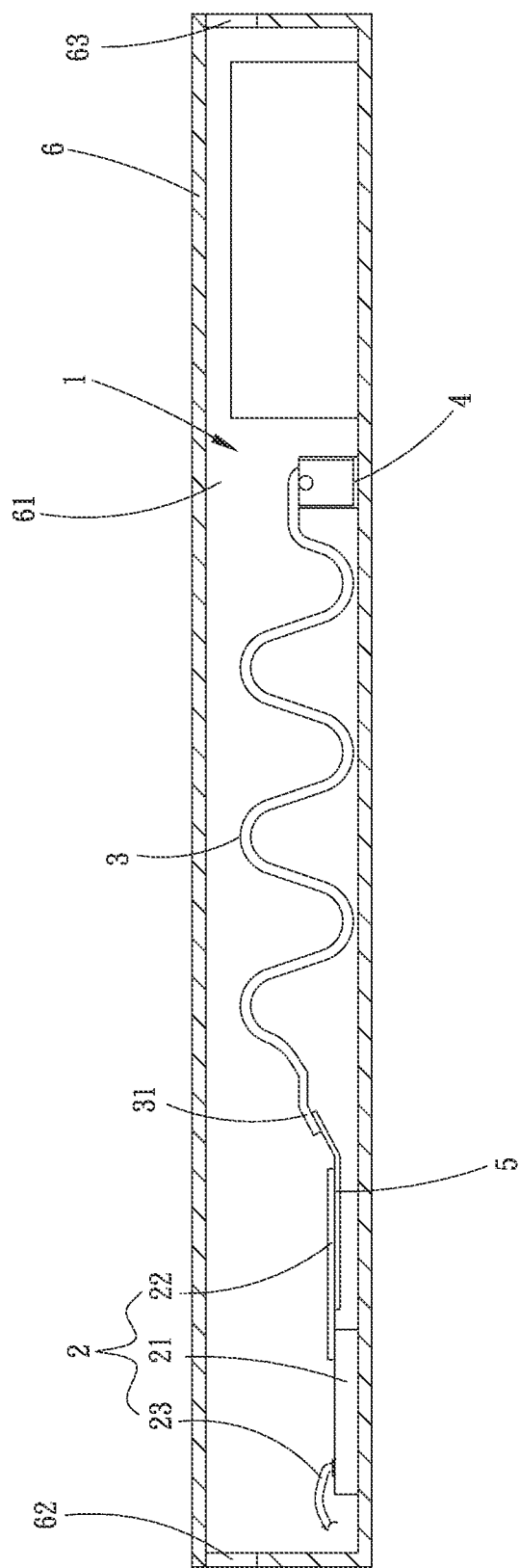
FIG. 6 is an assembled sectional side view showing the heat dissipation device of FIG. 4 in use.

FIGS. 4 and 5 are perspective and side views, respectively, of a heat dissipation device according to a second preferred embodiment of the present invention, and FIG. 6 is a sectional side view showing the second preferred embodiment in use. As shown, the second preferred embodiment is generally structurally similar to the first preferred embodiment, except for an interconnecting member 5 additionally provided between the oscillation assembly 2 and the air disturbing member 3. More specifically, the interconnecting member 5 is connected at an end to the first end 31 of the air disturbing member 3 and at an opposite end to the oscillating member 22 of the oscillation assembly 2. Similarly, the interconnecting member 5 is connected to the air disturbing member 3 and the oscillating member 22 by way of adhesive bonding, screw fastening or hot-melt bonding. When an electric power is supplied via the conductor wire 23 to the base 21, a resonant frequency is produced to thereby oscillate the oscillating member 22 upward and downward. Via the interconnecting member 5, the upward and downward oscillated oscillating member 22 further brings the air disturbing member 3 to vibrate. The vibration propagates through every section of the air disturbing member 3 and accordingly, produces a continuous wave of the air disturbing member 3 to disturb air in the receiving space 61 and form a relatively high static pressure of air in the outer case 6, forcing the air toward the fixing seat 4 and the heat source 64 and finally out of the outer case 6 via the second opening 63. At the same time, air outside the outer case 6 is induced into the receiving space 61 via the first opening 62. In this manner, convection of air inside and outside the outer case 6 occurs to achieve the effect of dissipating the heat produced by the heat source 64 into the environment outside the electronic device. With the heat dissipation device according to the second preferred embodiment of the present invention, it is also able to effectively enhance the air convection in the very limited space of the outer case 6 of the electronic device and enable largely upgraded heat dissipation efficiency.

Figure 7:
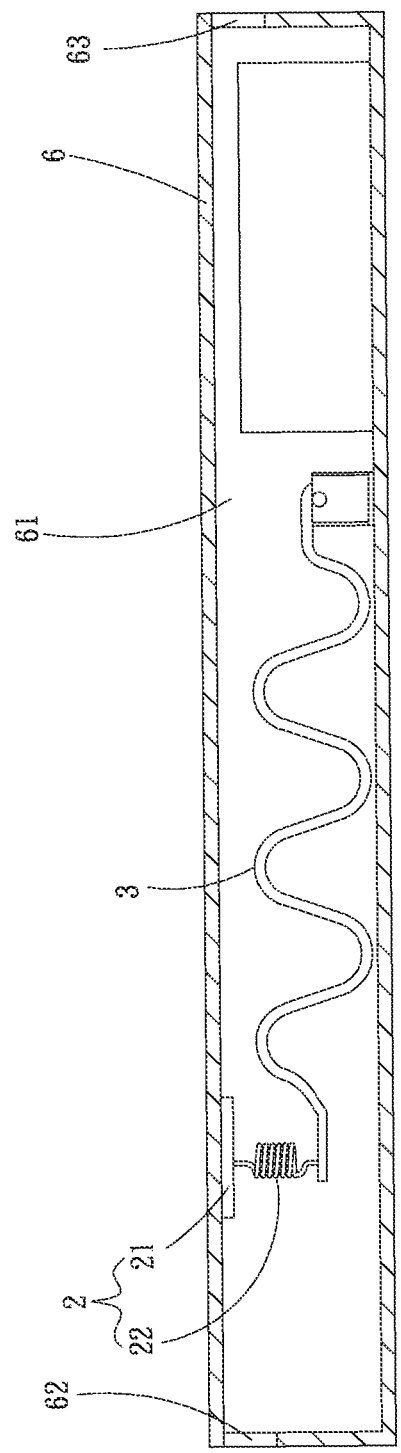
FIG. 7 is an assembled sectional side view showing a heat dissipation device according to a third preferred embodiment of the present invention in use.

FIG. 7 is a sectional side view showing a heat dissipation device according to a third preferred embodiment of the present invention in use. As shown, the third preferred embodiment is generally structurally similar to the first preferred embodiment, except for an oscillation assembly 2 configured as a spring assembly. In the third preferred embodiment, the base 21 is a spring holder and the oscillating member 22 is a spring element. When the oscillating member 22 is oscillated upward and downward, it further brings the air disturbing member 3 to vibrate. The vibration propagates through every section of the air disturbing member 3 and accordingly, produces a continuous wave of the air disturbing member 3 to disturb air in the receiving space 61 and form a relatively high static pressure of air in the outer case 6, forcing the air toward the fixing seat 4 and the heat source 64 and finally out of the outer case 6 via the second opening 63. At the same time, air outside the outer case 6 is induced into the receiving space 61 via the first opening 62. In this manner, convection of air inside and outside the outer case 6 occurs to achieve the effect of dissipating the heat produced by the heat source 64 into the environment outside the electronic device. With the heat dissipation device according to the third preferred embodiment of the present invention, it is also able to effectively enhance the air convection in the very limited space of the outer case 6 of the electronic device and enable largely upgraded heat dissipation efficiency.

Figure 8A:
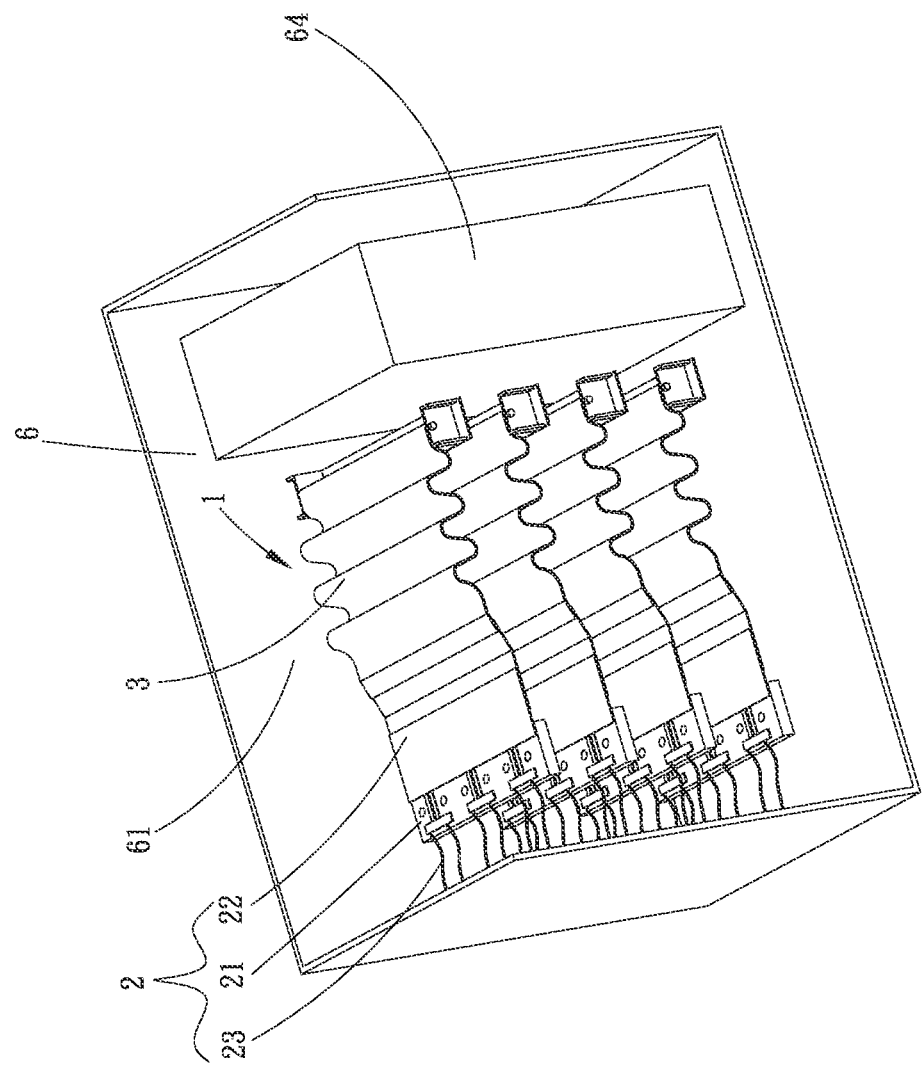
FIG. 8A shows a first manner of using a plurality of heat dissipation devices according to a fourth preferred embodiment of the present invention.
Figure 8B:
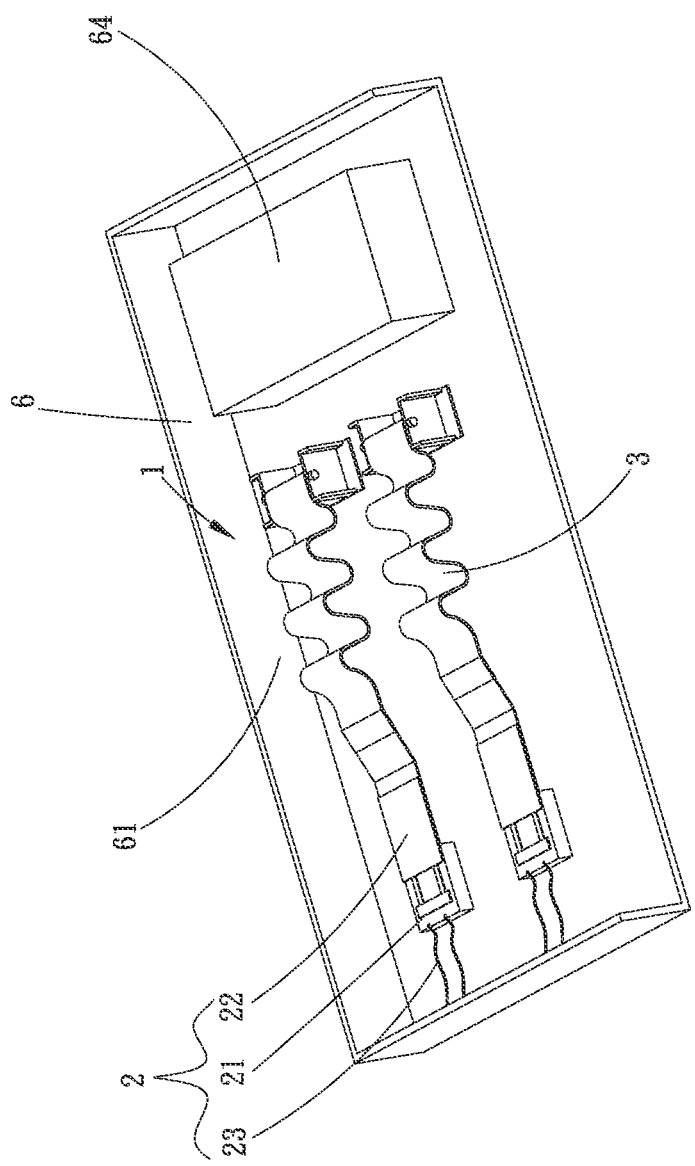
FIG. 8B shows a second manner of using a plurality of heat dissipation devices according to a fourth preferred embodiment of the present invention.
Figure 9A:
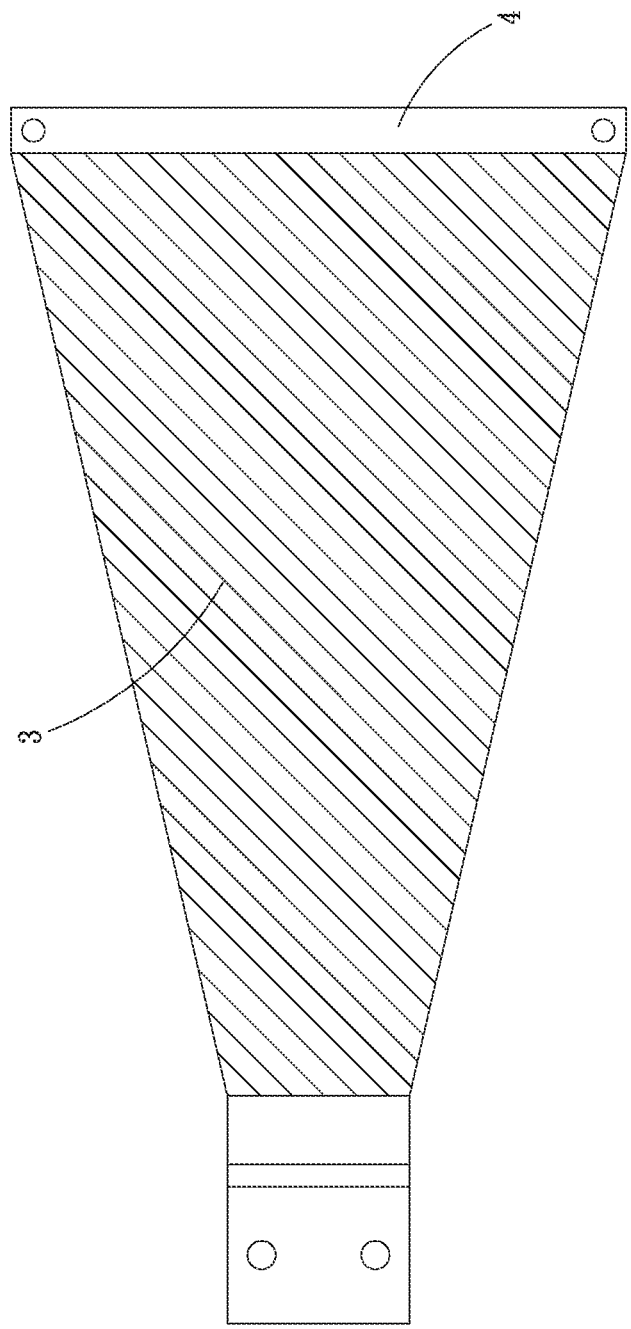
FIG. 9A is a top view of a heat dissipation device according to a fifth preferred embodiment of the present invention.
Figure 9B:
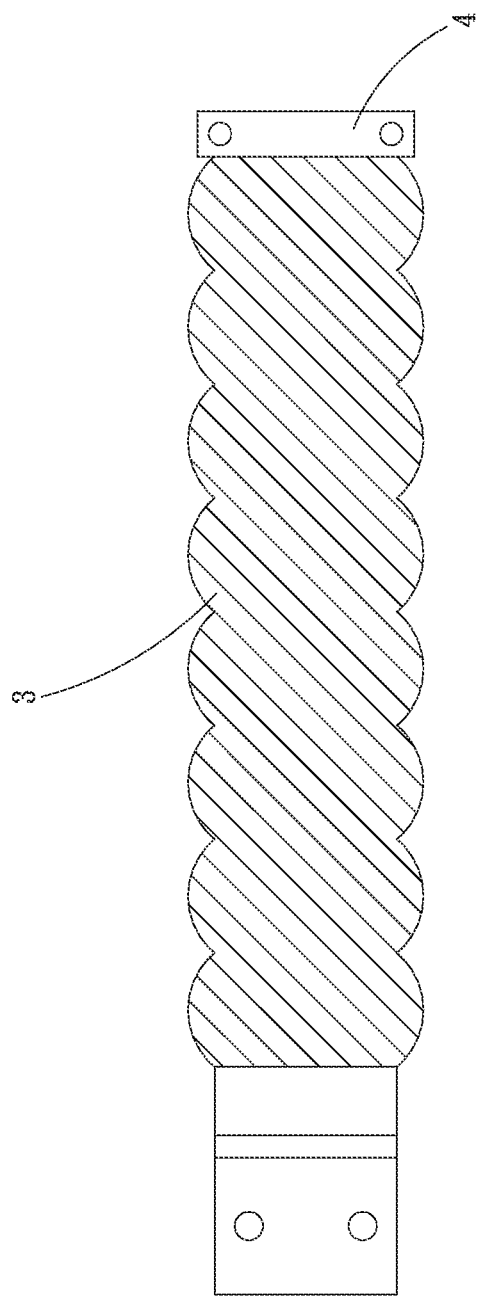
FIG. 9B is a top view of a heat dissipation device according to a sixth preferred embodiment of the present invention.
Figure 9C:
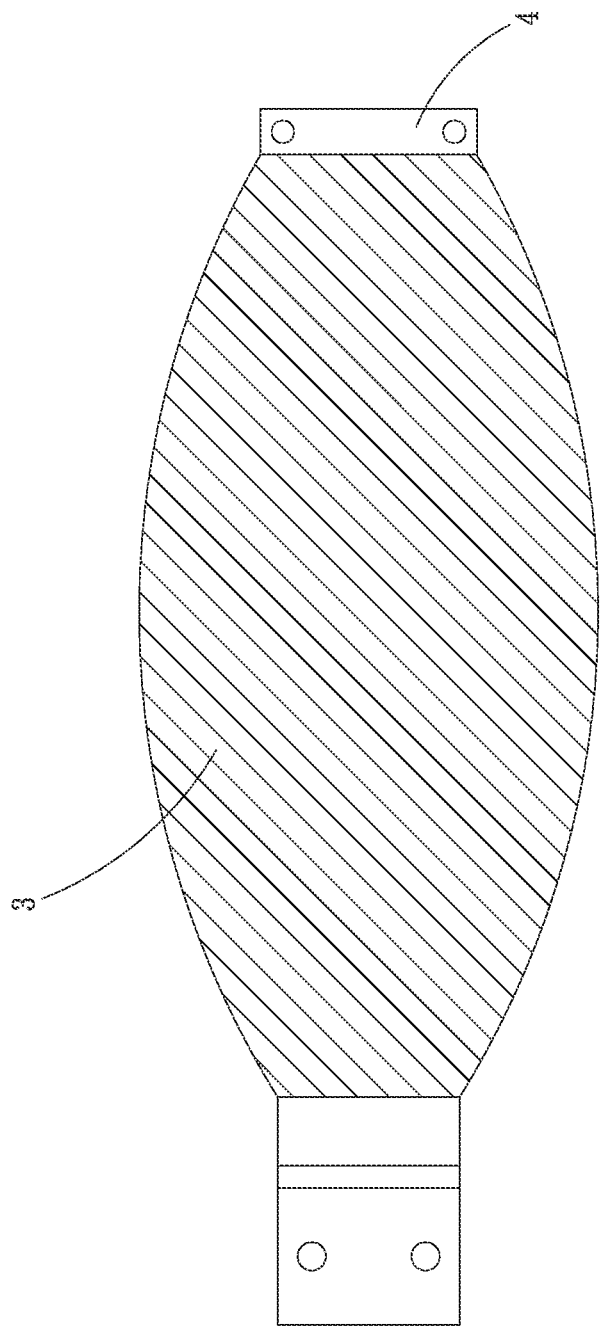
FIG. 9C is a top view of a heat dissipation device according to a seventh preferred embodiment of the present invention.
Figure 9D:
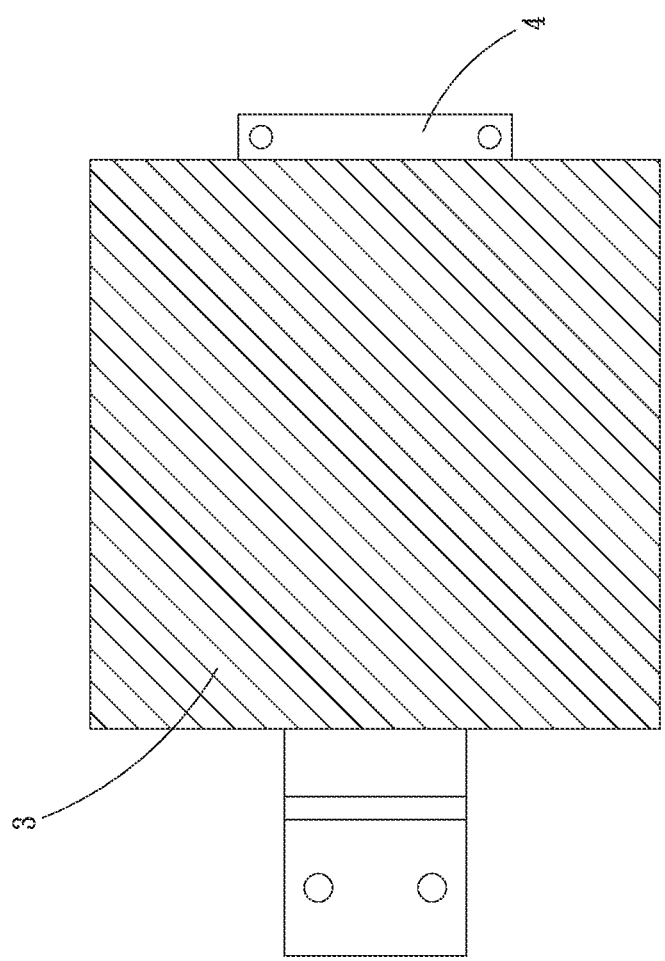
FIG. 9D is a top view of a heat dissipation device according to an eighth preferred embodiment of the present invention.
Figure 9G:
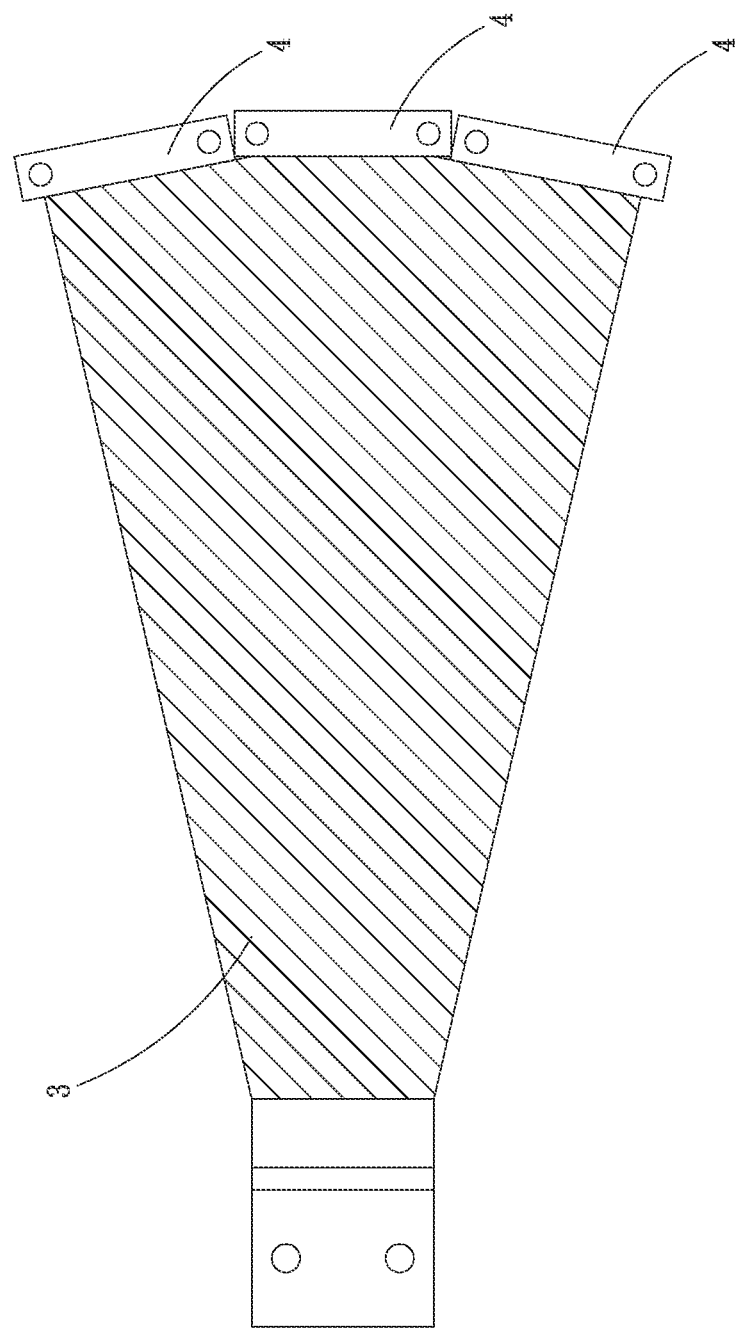
FIG. 9G is a top view of a heat dissipation device according to an eleventh preferred embodiment of the present invention.

Please refer to FIGS. 8A and 8B. As a fourth preferred embodiment of the present invention, more than one heat dissipation device 1 according to any of the previous preferred embodiments can be arranged in the outer case 6, depending on the size of the receiving space 61 and the arrangement of the heat source 64 in the outer case 6. In the case of having a relatively large receiving space 61 that requires enhanced heat dissipation, multiple heat dissipation devices 1 may be horizontally arranged in the receiving space 61 from top to bottom to vertically space from one another, as shown in FIG. 8A, or be horizontally arranged in the same one plane in the receiving space 61 to laterally space from one another, as shown in FIG. 8B. Moreover, in the fourth preferred embodiment, the oscillation assemblies 2, the air disturbing member 3 and the fixing seats 4 may have correspondingly increased widths to disturb more air volume in the outer case 6. In FIG. 8A, four sets of the heat dissipation devices 1 are arranged to match the size of the outer case 6 in use.

Please refer to FIGS. 9A to 9G, which are top views showing heat dissipation devices 1 according to a fifth to an eleventh preferred embodiment of the present invention. According to actual need in use, the air disturbing member 3 for the heat dissipation device of the present invention may be differently shaped, such as being trapezoidal, round, oblong, polygonal or irregular in shape, or even in the shape of a circular sector, in which case a plurality of fixing seats 4 are correspondingly provided. In any of the above-mentioned shapes, the air disturbing member 3 can always cause convection of air inside and outside the outer case 6 to dissipate the heat produced by the heat source 64. Therefore, effective air convection in the very limited receiving space 61 of the outer case 6 can be achieved to largely upgrade the heat dissipation efficiency of the electronic device.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A heat dissipation device, comprising:
   an oscillation assembly including a base and an oscillating member provided on the base, wherein the oscillation assembly is a spring assembly with the base being a spring holder and the oscillating member being a spring element;
   an air disturbing member having a first end connected to the oscillating member and an opposite second end;
   at least one fixing seat, to which the second end of the air disturbing member is connected; and
   wherein the spring element of the oscillation assembly is oscillated upward and downward, and brings the air disturbing member to vibrate.

2. The heat dissipation device as claimed in claim 1, further comprising an interconnecting member arranged between the oscillation assembly and the air disturbing member; and the interconnecting member being connected at an end to the first end of the air disturbing member and at an opposite end to the oscillating member of the oscillation assembly.

3. The heat dissipation device as claimed in claim 1, wherein the fixing seat has a joint connection portion configured for connecting to the second end of the air disturbing member.

4. The heat dissipation device as claimed in claim 1, wherein the oscillation assembly is an assembly adapted to generate a fixed-frequency oscillation.

5. The heat dissipation device as claimed in claim 1, wherein the air disturbing member is made of a piece of elastic fiber fabric.

6. The heat dissipation device as claimed in claim 1, wherein the heat dissipation device is arranged in a receiving space defined in an outer case of an electronic device, and the outer case being provided with at least one first opening and at least one second opening and having at least one heat source located therein.

7. The heat dissipation device as claimed in claim 6, wherein the oscillation assembly vibrates the first end of the air disturbing member via the oscillating member to thereby produces a continuous wave of the air disturbing member, so that the waving air disturbing member disturbs air in the receiving space of the outer case, forcing the air toward the heat source and causing air convection between the first and the second opening.

* * * * *